US012287985B2

United States Patent
Li et al.

(10) Patent No.: US 12,287,985 B2
(45) Date of Patent: Apr. 29, 2025

(54) SYSTEMS, METHODS, AND APPARATUS FOR MEMORY ACCESS IN STORAGE DEVICES

(71) Applicant: Samsung Electronics Co., Ltd., Suwon-si (KR)

(72) Inventors: Zongwang Li, Dublin, CA (US); Tong Zhang, Mountain View, CA (US); Rekha Pitchumani, Oak Hill, VA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 79 days.

(21) Appl. No.: 17/494,823

(22) Filed: Oct. 5, 2021

(65) Prior Publication Data

US 2023/0050808 A1 Feb. 16, 2023

Related U.S. Application Data

(60) Provisional application No. 63/231,706, filed on Aug. 10, 2021.

(51) Int. Cl.
*G06F 3/06* (2006.01)
*G06F 9/54* (2006.01)
*G06F 13/16* (2006.01)

(52) U.S. Cl.
CPC .......... *G06F 3/0659* (2013.01); *G06F 3/0604* (2013.01); *G06F 3/0673* (2013.01); *G06F 9/541* (2013.01); *G06F 13/1668* (2013.01)

(58) Field of Classification Search
CPC .... G06F 3/0659; G06F 3/0604; G06F 3/0673; G06F 9/541; G06F 13/1668
See application file for complete search history.

(56) References Cited

U.S. PATENT DOCUMENTS 6,389,493 B1 * 5/2002 Barkley .............. G06F 13/4269
710/110
8,959,298 B2    2/2015 Chun et al.
(Continued)

FOREIGN PATENT DOCUMENTS

GB          201914353        11/2019
KR          102101622 B1     4/2020

OTHER PUBLICATIONS

Liu Ke et al; "RecNMP: Accelerating Personalized Recommendation with Near-Memory Processing"; 2019; arxiv.org; pp. 1-14 (Year: 2019).*

(Continued)

*Primary Examiner* — Idriss N Alrobaye
*Assistant Examiner* — Richard B Franklin
(74) *Attorney, Agent, or Firm* — Renaissance IP Law Group LLP

(57) ABSTRACT

A method for memory access may include receiving, at a device, a first memory access request for a parallel workload, receiving, at the device, a second memory access request for the parallel workload, processing, by a first logical device of the device, the first memory access request, and processing, by a second logical device of the device, the second memory access request. Processing the first memory access request and processing the second memory access request may include parallel processing the first and second memory access requests. The first logical device may include one or more first resources. The method may further include configuring the first logical device based on one or more first parameters of the parallel workload. The method may further include allocating one or more first resources to the first logical device based on at least one of the one or more first parameters of the parallel workload.

20 Claims, 9 Drawing Sheets

(56) References Cited

U.S. PATENT DOCUMENTS

| | | | |
|---|---|---|---|
| 9,098,402 B2 | 8/2015 | Fanning et al. | |
| 9,626,108 B2 | 4/2017 | Stabrawa et al. | |
| 9,940,287 B2 | 4/2018 | Sharma | |
| 10,331,600 B1 | 6/2019 | Rajadnya et al. | |
| 10,838,865 B2 | 11/2020 | Leidel et al. | |
| 10,929,291 B2 | 2/2021 | Jung et al. | |
| 10,949,120 B2 | 3/2021 | Bahirat et al. | |
| 11,429,300 B2 * | 8/2022 | Pekney | G06F 3/0604 |
| 11,995,475 B2 * | 5/2024 | Croxford | G06F 1/3296 |
| 2003/0088742 A1 | 5/2003 | Lee et al. | |
| 2005/0125563 A1 * | 6/2005 | Douglas | H04L 67/1036 709/250 |
| 2018/0199292 A1 * | 7/2018 | Mula | H04L 12/44 |
| 2020/0042246 A1 | 2/2020 | Maharana et al. | |
| 2020/0125503 A1 | 4/2020 | Graniello et al. | |
| 2020/0371700 A1 * | 11/2020 | Stabrawa | G06F 3/0631 |
| 2021/0011755 A1 | 1/2021 | Shah | |
| 2021/0011864 A1 | 1/2021 | Bernat et al. | |
| 2021/0019069 A1 | 1/2021 | Sen et al. | |
| 2021/0049116 A1 | 2/2021 | Ramesh et al. | |
| 2021/0133123 A1 | 5/2021 | Feehrer et al. | |
| 2021/0149763 A1 | 5/2021 | Ranganathan et al. | |
| 2021/0173785 A1 | 6/2021 | Jin et al. | |

OTHER PUBLICATIONS

European Extended Search Report for Application No. 22189413.2, mailed Jan. 30, 2023.

Ke, Liu et al., "RecNMP: Accelerating Personalized Recommendation with Near-Memory Processing," arxiv.org, 2019, 14 pages.

Pinneterre, Sébastien et al., "vFPGAmanager: A Virtualization Framework for Orchestrated FPGA Accelerator Sharing in 5G Cloud Environments," Virtual Open Systems, 2018 IEEE International Symposium on Broadband Multimedia Systems and Broadcasting (BMSB), 2018, 21 pages.

Wilkening, Mark et al., "RecSSD: Near Data Processing for Solid State Drive Based Recommendation Inference," Proceedings of the 26th ACM International Conference on Architectural Support for Programming Languages and Operating Systems (ASPLOS '21), 2021, 13 pages.

Xue, Mochi et al., "Scalable GPU Virtualization with Dynamic Sharing of Graphics Memory Space," IEEE Transactions on Parallel and Distributed Systems, vol. 29, No. 8, 2018, pp. 1823-1836.

Zhang, Jie et al., "ZnG: Architecting GPU Multi-Processors with New Flash for Scalable Data Analysis," 2020 ACM/IEEE 47th Annual International Symposium on Computer Architecture (ISCA), 2020, 12 pages.

* cited by examiner

SYSTEMS, METHODS, AND APPARATUS FOR MEMORY ACCESS IN STORAGE DEVICES

CROSS-REFERENCE TO RELATED APPLICATIONS

This application claims priority to, and the benefit of, U.S. Provisional Patent Application Ser. No. 63/231,706 titled "Systems, Methods, and Devices for Memory Management and Address Mapping" filed Aug. 10, 2021 which is incorporated by reference.

TECHNICAL FIELD

This disclosure relates generally to storage devices, and more specifically to systems, methods, and devices for memory access in storage devices.

BACKGROUND

Parallel computation workloads may be performed on devices such as graphics processing units (GPUs), accelerators, and/or other parallel processing devices that may have parallel computation units running multiple kernels. A parallel computation workload may request concurrent memory accesses to support parallel computations. For example, a parallel processing device may send concurrent requests to read multiple blocks of data from a storage device. The storage device may process the requests by reading the data blocks from media at the storage device.

The above information disclosed in this Background section is only for enhancement of understanding of the background of the invention and therefore it may contain information that does not constitute prior art.

SUMMARY

A method for memory access may include receiving, at a device, a first memory access request for a parallel workload, receiving, at the device, a second memory access request for the parallel workload, processing, by a first logical device of the device, the first memory access request, and processing, by a second logical device of the device, the second memory access request. Processing the first memory access request and processing the second memory access request may include parallel processing the first memory access request and the second memory access request. The first logical device may include one or more first resources. The one or more first resources may include one or more of a memory block, a memory superblock, a memory channel, a memory bank, a buffer, a queue, or a core. The second logical device may include one or more second resources. The first memory access request may include a tag corresponding to the first logical device. The first logical device may have a device physical address (DPA), and the DPA may be mapped to a physical block address (PBA) of the one or more first resources. The method may further include configuring the first logical device based on one or more first parameters of the parallel workload. The one or more first parameters may include one or more of a bandwidth, a table size, a number of tables, a vector size, or a number of vectors. Configuring the first logical device may be performed by a fabric manager. The method may further include allocating one or more first resources to the first logical device based on at least one of the one or more first parameters of the parallel workload. The method may further include mapping the one or more first resources to the first logical device. The method may further include configuring the second logical device based on one or more second parameters of the parallel workload. The device may include a storage device.

A device may include a communication interface, a first logical device configured to receive, through the communication interface, a first memory access request, and process, using one or more first resources, the first memory access request, and a second logical device configured to receive, through the communication interface, a second memory access request, and process, using one or more second resources, the second memory access request. The first logical device and the second logical device may be configured to parallel process the first memory access request and the second memory access request. The device may further include support logic configured to allocate the one or more first resources to a first logical device based on first configuration information received through the communication interface, and mapping logic configured to map the one or more first resources to the first logical device. The support logic may be configured to allocate the one or more second resources to a second logical device based on second configuration information received through the communication interface, and the mapping logic may be configured to map the one or more second resources to the second logical device. The support logic may be configured to receive the first configuration information by an application programming interface. The device may include a storage device. The communication interface may include a memory coherent interface.

A system may include a parallel processing apparatus, a communication fabric, a device coupled to the parallel processing apparatus through the communication fabric, the device comprising a first logical device and a second logical device, and a memory allocator configured to direct a first memory access request from the parallel processing apparatus to the first logical device. The memory allocator may be configured to direct a second memory access request from the parallel processing apparatus to the second logical device. The device may be configured to process, by the first logical device, the first memory access request, and process, by the second logical device, the second memory access request. The system may further include a fabric manager configured to configure the first logical device based on a first parameter of a workload for the parallel processing apparatus, and configure the second logical device based on a second parameter of the workload for the parallel processing apparatus.

A device may include a communication interface, one or more first memory resources, one or more second memory resources, support logic configured to allocate the one or more first memory resources to a first logical device based on first configuration information received through the communication interface, and mapping logic configured to map the one or more first memory resources to the first logical device. The support logic may be configured to allocate the one or more second memory resources to a second logical device based on second configuration information received through the communication interface, and the mapping logic may be configured to map the one or more second memory resources to the second logical device. The support logic may be configured to receive the first configuration information by an application programming interface.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Figure 1:
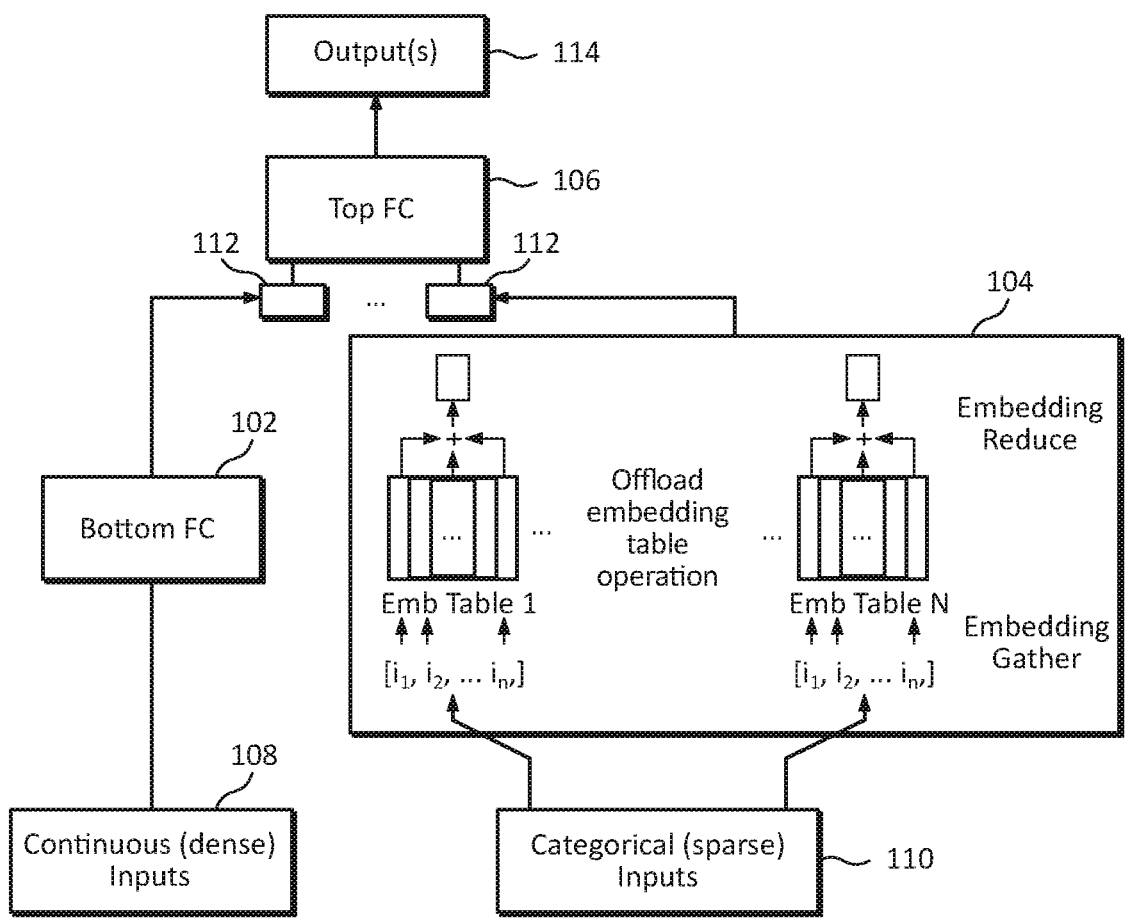
FIG. 1 illustrates an embodiment of a deep learning recommendation model (DLRM) that may use concurrent memory access requests in accordance with example embodiments of the disclosure.

A storage device in accordance with example embodiments of the disclosure may support parallel computation workloads by processing concurrent memory requests using multiple logical devices that may be configured with different amounts of memory resources based on the bandwidth requirements of different memory requests. For example, a storage device may configure a first logical device with a relatively small amount of memory resources (e.g., memory channels and/or memory banks) to process a first memory access request having a relatively small bandwidth requirement. The storage device may configure a second logical device with a relatively large amount of memory resources to process a second memory access request having a relatively large bandwidth requirement. The first and second logical devices may process the first and second concurrent memory requests in parallel. Depending on the implementation details, this may improve the performance of a parallel computation workload which, in some example embodiments, may only proceed after all concurrent memory requests are completed.

In some embodiments, a storage device may be coupled to a parallel computation device through a communication fabric. In such an embodiment, one or more logical devices for the storage device may be configured by a fabric manager. For example, the fabric manager may configure one or more logical devices based on one or more corresponding parameters such as a bandwidth for each of one or more concurrent memory access requests for a parallel computation workload. Information on the parameters may be provided to the fabric manager, for example, by an application running on a host and/or a parallel computation device. In some embodiments, configuring a logical device may include providing the logical device with a device physical address (DPA).

In some embodiments, after one or more logical devices have been configured by a fabric manager, resources may be allocated to the one or more logical devices. For example, a storage device may have a pool of one or more memory channels that may initially be unallocated. Support logic at the storage device may allocate one or more of the pooled memory channels to each of the configured logical devices based, for example, on configuration information received at the storage device. The configuration information may include, for example, one or more parameters such as a bandwidth for each logical device. In some embodiments, the configuration information may be provided to the support logic through an application programming interface (API). Other examples of resources that may be allocated to the one or more logical devices may include memory banks, buffers, cores, queues, and/or the like.

In some embodiments, after resources have been allocated to one or more logical devices, the resources may be mapped to the one or more logical devices. For example, a physical block address (PBA) for each allocated resource may be mapped to a DPA for the corresponding logical device. In some embodiments, a DPA-to-PBA (DPA2PBA) mapper at a storage device may map one or more DPAs to a PBA for each logical device. In some embodiments, a mapper may dynamically map resources to logical devices, for example, by changing the mappings when one or more logical devices are configured or reconfigured, when resources are reallocated and/or returned to a pool, and/or the like.

The principles disclosed herein have independent utility and may be embodied individually, and not every embodiment may utilize every principle. However, the principles may also be embodied in various combinations, some of which may amplify the benefits of the individual principles in a synergistic manner.

For purposes of illustration, some embodiments may be described in the context of a device implemented as a storage device. However, the principles of this disclosure may be implemented with any type of device that may process memory access requests including, for example, caching devices, accelerators with memory, memory buffer devices, network interface cards (NICs) with memory, and/or the like. Moreover, for purposes of illustration, some embodiments may be described in the context of a storage device implemented as a solid state drive (SSD) with flash memory storage media. The principles of this disclosure, however, may be implemented with any type of storage device using any type of memory and/or storage media including any other type of solid state media, magnetic media, optical media, and/or the like. For example, in some embodiments, a storage device may be implemented as an SSD based on not-AND (NAND) flash memory, persistent memory (PMEM) such as cross-gridded nonvolatile memory, memory with bulk resistance change, phase change memory (PCM), dynamic random access memory (DRAM), and/or the like, and/or any combination thereof.

FIG. 1 illustrates an embodiment of a deep learning recommendation model (DLRM) that may use concurrent memory access requests in accordance with example embodiments of the disclosure. The embodiment illustrated in FIG. 1 may include one or more bottom fully connected (FC) layers 102, one or more embedding tables 104 (e.g., Emb Table 1, ..., Emb Table N), and a top FC layer 106. The one or more bottom FC layers 102 may process continuous (e.g., dense) inputs 108, whereas the embedding tables 104 may process categorical (e.g., sparse) inputs 110. The outputs 112 of the one or more bottom FC layers 102 and/or the one or more embedding tables 104 may be applied to the top FC layer 106 which may provide one or more final outputs 114. The embedding tables 104 (e.g., Emb Table 1, ..., Emb Table N) may include vectors that may be aggregated using one or more operators such as the summation operators (+) illustrated in FIG. 1. In some embodiments, the embedding tables 104 may use a relatively large amount of memory.

The embodiment illustrated in FIG. 1 may perform sparse-length-sum (SLS) processing which may involve reading vectors from some or all of the embedding tables 104 and performing vector operations over some or all of the vectors. In some embodiments, embedding table operations may be offloaded to one or more near data processing (NDP) storage devices. However, embedding table rows and/or columns may have variable sizes that may involve non-uniform memory access bandwidth for different tables. Depending on the implementation details, this may result in low throughput and/or long latencies.

Figure 2:
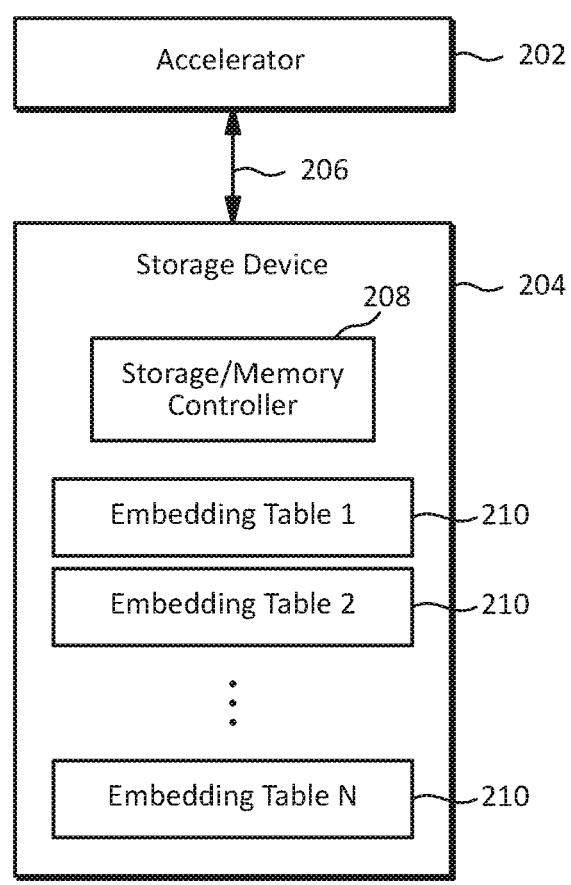
FIG. 2 illustrates an embodiment of a parallel computation system in accordance with example embodiments of the disclosure.

FIG. 2 illustrates an embodiment of a parallel computation system in accordance with example embodiments of the disclosure. The embodiment illustrated in FIG. 2 may be used, for example, to implement the DLRM illustrated in FIG. 1.

Referring to FIG. 2, an accelerator 202 and a storage device 204 may communicate through a connection 206. The accelerator 202 may include apparatus that may implement, for example, the bottom FC layer 102, top FC layer 106, and/or the summation operators (+) illustrated in FIG. 1. The storage device 204 may include a storage device and/or memory controller 208 and embedding tables 210 (e.g., Embedding Table 1, Embedding Table 2, ..., Embedding Table N) that may implement, for example, one or more of the embedding tables 104 (e.g., Emb Table 1, ..., Emb Table N) illustrated in FIG. 1. The connection 206 may be implemented with any suitable interface and/or protocol including any of those mentioned below.

The storage device 204 may be implemented, for example, with storage media based on NAND flash memory. However, depending on the implementation details, if the storage device 204 is implemented with NAND flash memory and used to implement the embedding tables 104 illustrated in FIG. 1, it may result in especially long tail latencies for memory accesses related to the embedding tables 104.

Figure 3:
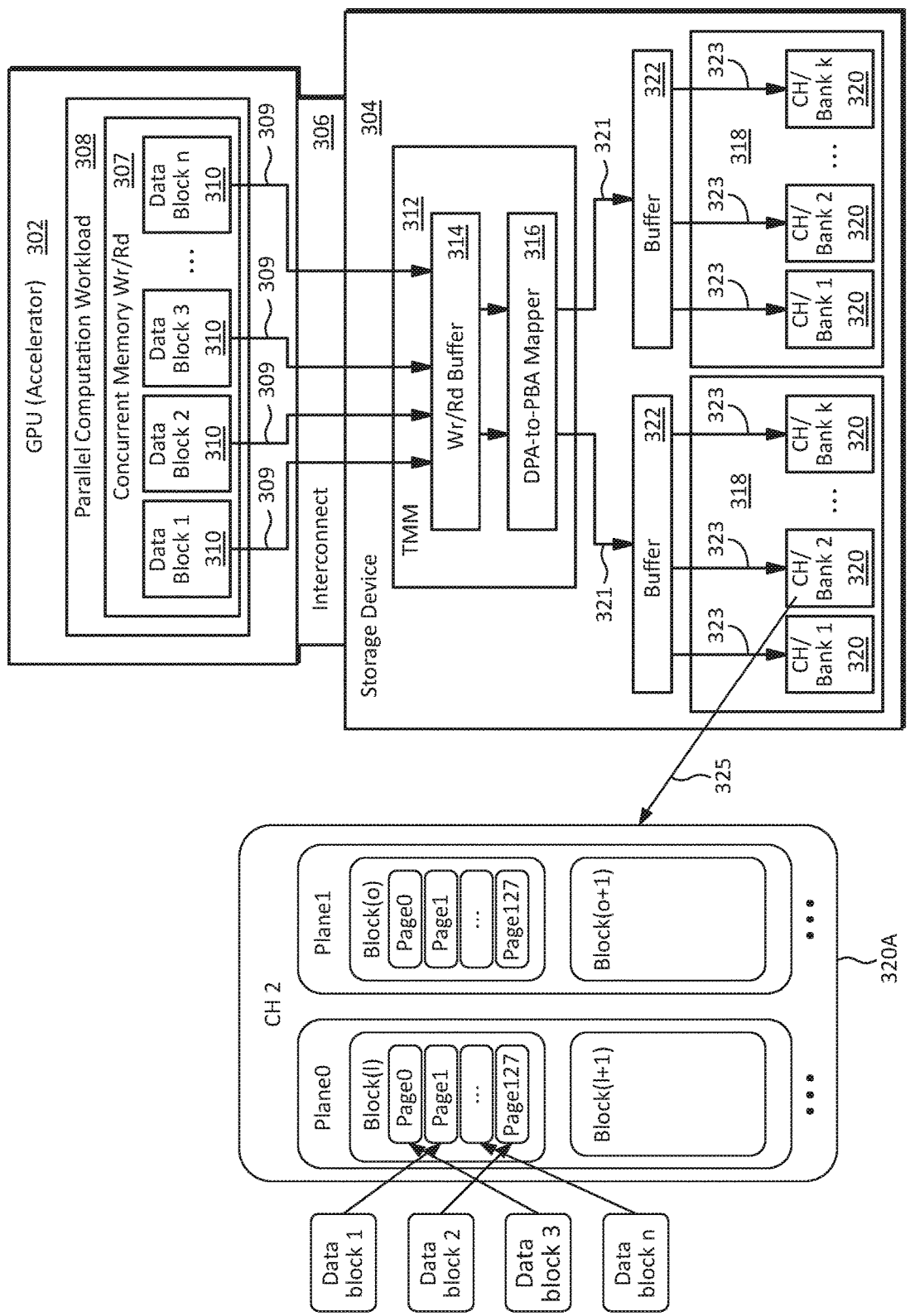
FIG. 3 illustrates another embodiment of a parallel computation system in accordance with example embodiments of the disclosure.

FIG. 3 illustrates another embodiment of a parallel computation system in accordance with example embodiments of the disclosure. The embodiment illustrated in FIG. 3 may include a GPU 302 and a storage device 304 communicating through an interconnect 306. The GPU 302 may be used, for example, as an accelerator and may include parallel computation units to run parallel computation workloads such as DLRM workloads. A parallel computation workload 308 may send concurrent memory access write and/or read requests 309 for a concurrent memory write and/or read operation 307 to the storage device 304 to write and/or read data blocks 310 (e.g., Data Block 1, Data Block 2, ..., Data Block n) to and/or from the storage device 304.

The storage device 304 may be implemented, for example, as a Compute Express Link (CXL) Type-3 single logical device (SLD). Thus, the interconnect 306 may be implemented as a CXL interconnect. The storage device 304 may include a tiered memory manager (TMM) 312 which may include a write and/or read buffer 314 and a DPA-to-PBA mapper 316. The storage device 304 may further include one or more groups 318 of memory channels and/or banks 320. A corresponding buffer 322 may buffer write and/or read operations to and/or from the groups 318. The write and/or read buffer 314 may buffer the write and/or read requests 309 which may be forwarded as requests 321 to one or more buffers 322. The one or more buffers 322 may buffer the requests 321 which may be forwarded as requests 323 to one or more memory channels and/or banks 320 which may process the requests 323. The DPA-to-PBA mapper 316 may translate a DPA of the storage device 309 to PBAs of the memory channels and/or banks 320.

The embodiment illustrated in FIG. 3 may be used, for example, to implement a DLRM such as that illustrated in FIG. 1. In such an embodiment, the data blocks 310 may be stored in specific memory channels and/or banks 320 without any information from an application that may use the data blocks 310. For example, the memory resources (e.g., 318, 320, 322) of the storage device 304 may be allocated to a parallel computation application 308 implementing the DLRM and/or concurrent write and/or read requests 308 based on a quality of service (QoS) basis that may allocate the resources per namespace, user, input and/or output (IO), and/or the like.

Thus, Data Block 1, Data Block 2, ..., Data Block n may be stored in various pages of a single block (Block (I)) of a single plane (Plane 0) of a single channel (CH 2) as shown in the map 320A of CH 2 illustrated on the left side of FIG. 3 as indicated by arrow 325. Therefore, Data Block 1, Data Block 2, ..., Data Block n may be accessed sequentially even though they may have been requested with concurrent write and/or read requests 309. Depending on the implementation details, this may slow down the parallel computation application 308 which may not be able to proceed until the write and/or read requests 309 are all completed. For example, in some situations, the total time for processing the write and/or read requests 309 may be the summation of the write and/or read times for all of Data Block 1, Data Block 2, ..., Data Block n.

Figure 4:
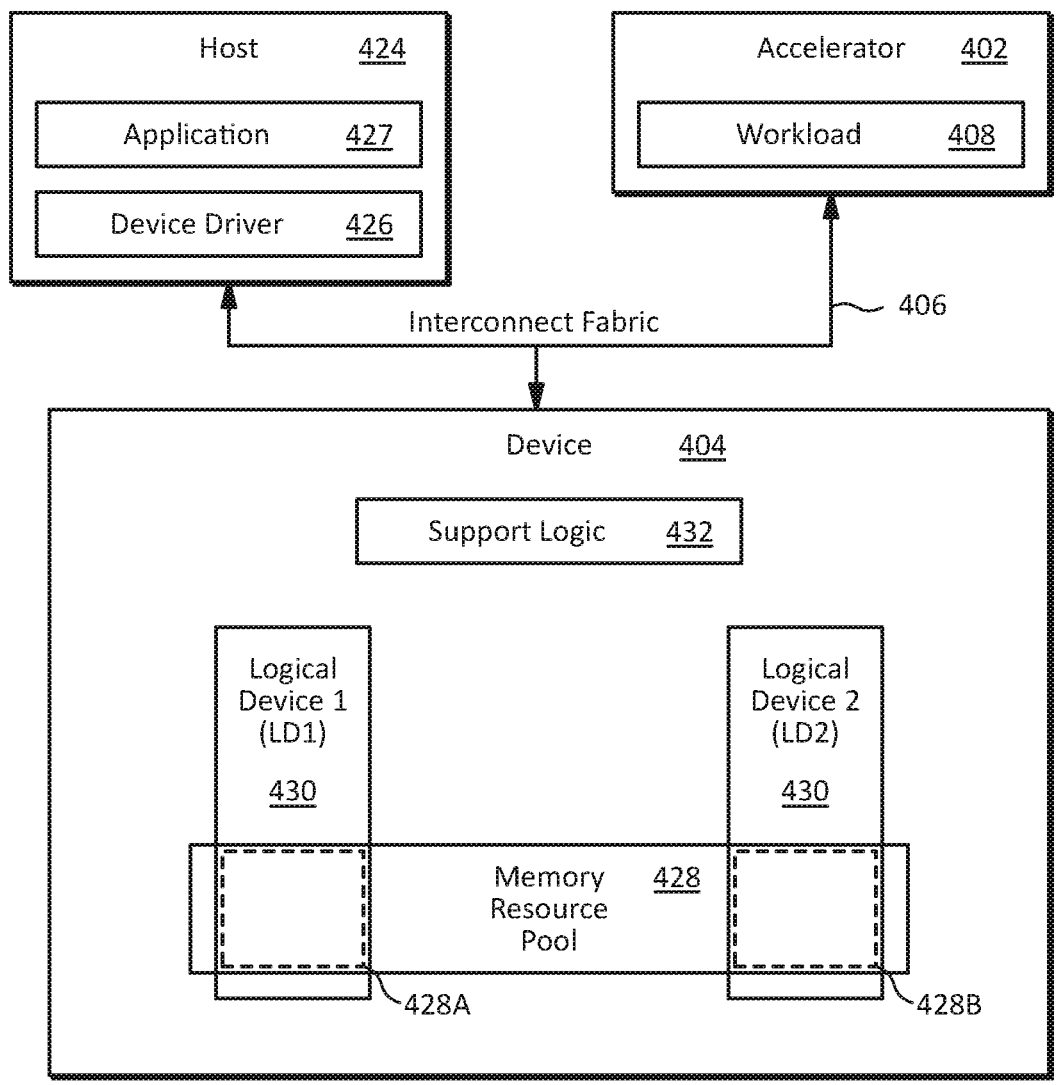
FIG. 4 illustrates an embodiment of a system for concurrent memory access in accordance with example embodiments of the disclosure.

FIG. 4 illustrates an embodiment of a system for concurrent memory access in accordance with example embodiments of the disclosure. The system illustrated in FIG. 4 may include an accelerator 402, a device 404, and a host 424 communicating through an interconnect fabric 406. The accelerator 402 may be implemented, for example, as any type of device that may issue concurrent memory access requests. For example, in some embodiments, the accelerator 402 may be implemented with parallel computation units that may run, for example, a parallel computation workload 408 such as the DLRM illustrated in FIG. 1. The parallel computation workload 408 may send concurrent memory access requests to the device 404 to write and/or read data for the parallel computation workload 408 to and/or from the device 404.

The host 424 may include a device driver 426 that may implement various support functions for the device 404 and or accelerator 402. For example, in some embodiments, the device driver 426 may implement a fabric manager for the interconnect fabric 406 and/or a memory allocator to allocate one or more memory resources of the device 404 to the parallel computation workload 408 and/or memory access requests that may be sent by the parallel computation workload 408.

In some embodiments, the host 424 may execute all or a portion of an application 427 for the parallel computation workload 408. For example, the host 424 may execute an application 427 that may perform one or more supervisory functions and/or offload one or more parallel computations to the parallel computation workload 408 at the accelerator 402.

The device 404 may include a pool of resources 428 that may be allocated to one or more logical devices (LDs) 430 (e.g., LD1, . . . , LDn) based on information about the parallel computation workload 408 including information about one or more memory access requests that the parallel computation workload 408 may send to the device 404. The one or more logical devices 430 may process memory access requests from the parallel computation workload 408 using their respective allocated resources 428. In some embodiments, two or more logical devices 430 may process multiple memory access requests in parallel.

Examples of information that may be used for allocating the resources 428 to the one or more logical devices 430 may include a bandwidth of a memory access request, a size of a data structure (e.g., a table size and/or a vector size), a number of data structures (e.g., a number of tables and/or a number of vectors), and/or the like. Examples of resources 428 that may be allocated may include memory bandwidth, memory blocks, memory superblocks, memory channels, memory banks, buffers, queues (e.g., prioritized queues), cores (e.g., host cores (hcores) and/or flash cores (fcores)), and/or the like.

In some embodiments, one or more of the resources 428 may be allocated to the one or more logical devices 430 such that the amount of resources allocated to a logical device may slightly, substantially, or closely match a corresponding parameter of the parallel computation workload 408 such as a parameter of a memory access request from the parallel computation workload 408. For example, a relatively small amount of memory resources 428A (e.g., memory channels and/or memory banks) may be allocated to a first logical device to process a first memory access request having a relatively small bandwidth requirement, whereas a relatively large amount of memory resources 428B may be allocated to a second logical device to process a second memory access request having a relatively large bandwidth requirement.

In some embodiments, the device 404 may include support logic 432 that may allocate one or more of the resources 428 to the one or more logical devices 430. The support logic 432 may allocate one or more of the resources 428 to the one or more logical devices 430, for example, based on configuration information received from the application 427.

In some embodiments, the device driver 426 may implement a memory allocator that may direct one or more memory access requests (e.g., concurrent memory access requests) from the parallel computation workload 408 to the one or more logical devices 430 based, for example, on the one or more resources that have been allocated to the one or more logical devices 430. In some embodiments, the memory allocator may route a memory access request to one or more logical devices 430 based on a tag that the application 427 may provide for the request.

The device 404 may be implemented with any type of device that may process memory access requests including, for example, storage devices based on any type of memory and/or storage media, caching devices, accelerators with memory, memory buffer devices, network interface cards (NICs) with memory, and/or the like. In some embodiments, the device 404 may be implemented as a CXL device, for example, a CXL Type-1 device, a CXL Type-2 device, and/or a CXL Type-3 device including a CXL Type-3 multi logical device (MLD) device.

The interconnect fabric 406 may be implemented with one or more of any type interface and/or protocol including Peripheral Component Interconnect Express (PCIe), Non-volatile Memory Express (NVMe), NVMe-over-fabric (NVMe-oF), Ethernet, Transmission Control Protocol/Internet Protocol (TCP/IP), remote direct memory access (RDMA), RDMA over Converged Ethernet (ROCE), Fibre-Channel, InfiniBand, Serial ATA (SATA), Small Computer Systems Interface (SCSI), Serial Attached SCSI (SAS), iWARP, and/or the like, or any combination thereof. In some embodiments, the interconnect fabric 406 may be implemented with one or more memory semantic and/or memory coherent interface and/or protocol such as CXL, and/or CXL.mem, CXL.io, and/or CXL.cache, Gen-Z, Coherent Accelerator Processor Interface (CAPI), Cache Coherent Interconnect for Accelerators (CCIX), and/or the like, or any combination thereof.

Figure 5:
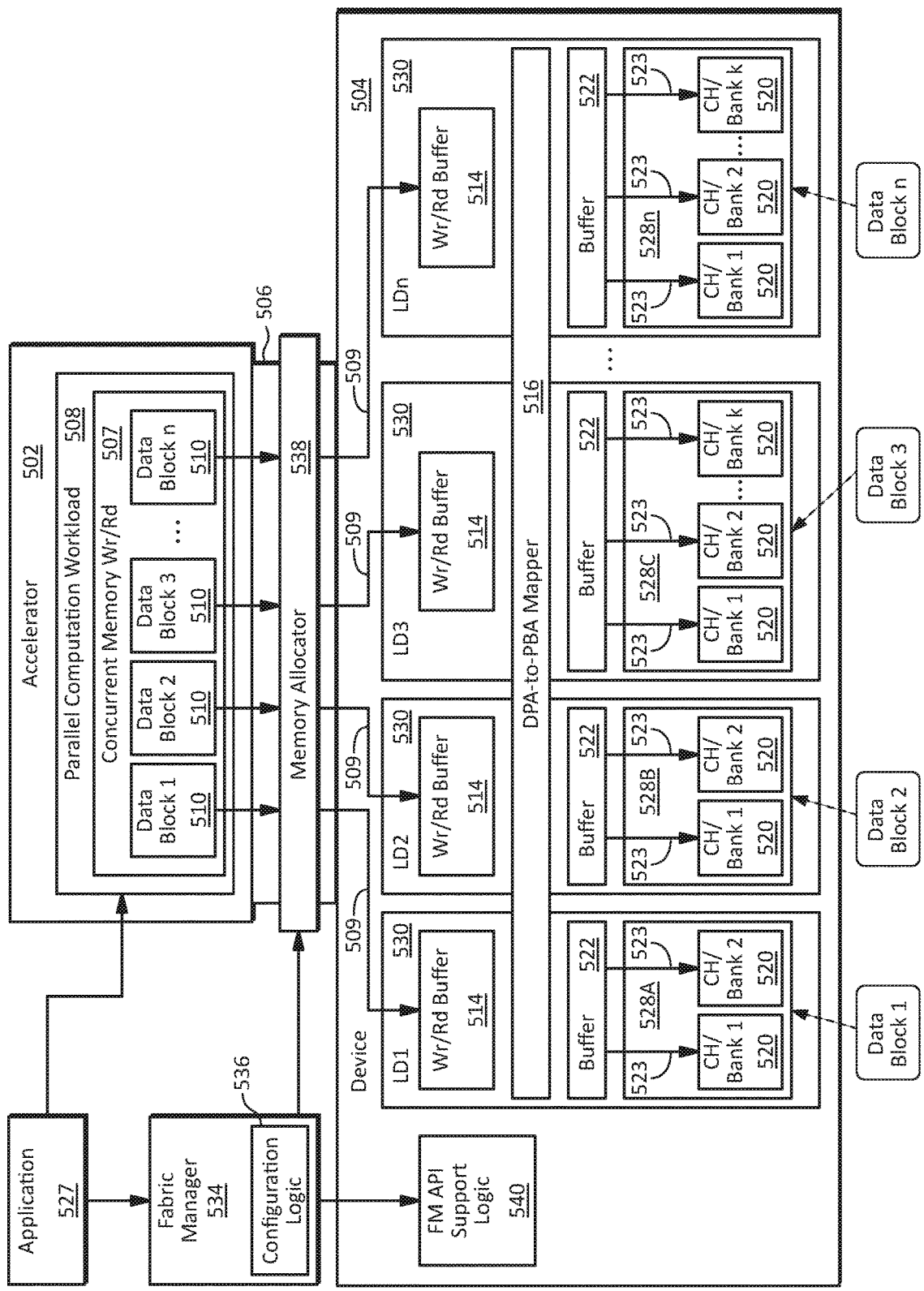
FIG. 5 illustrates an example embodiment of a system for concurrent memory access in accordance with example embodiments of the disclosure.

FIG. 5 illustrates an example embodiment of a system for concurrent memory access in accordance with example embodiments of the disclosure. The system illustrated in FIG. 5 may include an accelerator 502, and a storage device 504 communicating through an interconnect fabric 506. The accelerator 502 may be implemented, for example, as any type of device that may issue concurrent memory access requests. For example, in some embodiments, the accelerator 502 may be implemented with parallel computation units that may run, for example, a parallel computation workload 508 such as the DLRM illustrated in FIG. 1.

For purposes of illustration, in the example embodiment illustrated in FIG. 5, the interconnect fabric 506 may be implemented with CXL interconnects, and the device 504 may be implemented as a CXL Type-3 MLD device, but other embodiments may be implemented with any other type of interconnects and/or devices.

The system illustrated in FIG. 5 may further include a fabric manager (FM) 534 and a memory allocator 538. The fabric manager 534 may implement one or more logical processes that may query and/or configure one or more operational states of the interconnect fabric 506. In some embodiments, one or more functions of the fabric manager 534 may be accessed, for example, using a fabric manager application programming interface (FM API). In some embodiments, the fabric manager 534 may be implemented partially or entirely as part of a device driver for the device 504. The device driver may be executed, for example, on a host that may be connected to the interconnect fabric 506.

In some embodiments, the fabric manager 534 may include configuration logic 536 to configure one or more logical devices 530 (e.g., (e.g., LD1, LD2, . . . , LDn) based on information about the parallel computation workload 508 which may include information about one or more memory access requests 509 (e.g., concurrent memory access requests for a concurrent memory write and/or read operation 507) that the parallel computation workload 508 may send to the device 504. For example, configuring a logical device 530 may include one or more of creating (e.g., enumerating, instantiating, and/or the like) the logical device 530, specifying one or more resources for the logical device 530, creating a CXL binding for the logical device 530, assigning a DPA to the logical device 530, and/or the like. In some embodiments, one or more of the logical devices 530 may be bound to one or more virtual CXL switches (VCSs), for example, by the fabric manager 534.

Examples of information that may be used for allocating resources to the one or more logical devices 530 may include a bandwidth of a memory access request, a size of a data structure (e.g., a table size and/or a vector size), a number of data structures (e.g., a number of tables and/or a number of vectors), and/or the like. Examples of resources that may be specified may include memory bandwidth, memory blocks, memory superblocks, memory channels, memory banks, buffers, queues (e.g., prioritized queues), cores (e.g., host cores (hcores) and/or flash cores (fcores)), and/or the like.

In some embodiments, the configuration logic 536 may configure one or more of the logical devices 530, for example, by specifying an amount of memory bandwidth for each of the configured logical device 530 based on a bandwidth specification for a corresponding memory access request 509. A bandwidth (BW) of a memory access request 509 may be determined, for example, by an amount of data to be transferred for a corresponding data block 510 (e.g., Data Block 1, Data Block 2, . . . , Data Block n) to and/or from the storage device 504 based on a specified transfer time. Thus, the configuration logic 536 may configure each of logical devices LD1, LD2, . . . , LDn by specifying a memory bandwidth (e.g., BW1, BW2, . . . , BWn) adequate to transfer an amount of data in Data Block 1, Data Block 2, . . . , Data Block n, respectively, in the specified transfer time.

The device 504 may include FM API support logic 540 that may allocate one or more resources (e.g., from a pool of resources) to one or more of the logical devices 530, for example, as specified by configuration information provided by the configuration logic 536 of the fabric manager 534. For example, if the configuration logic 536 has configured a first logical device LD1 with a specified amount of memory bandwidth BW1, the FM API support logic 540 may allocate enough memory resources 528A to accommodate the specified bandwidth BW1. In the example embodiment, illustrated in FIG. 5, the memory resources 528A may include a first memory channel and/or memory bank (CH/Bank 1) and a second memory channel and/or memory bank (CH/Bank 2). In some embodiments, the allocated memory resources 528A may further include memory blocks, memory superblocks, and/or any buffers, queues, cores, and/or the like to support the allocated memory channels and/or memory banks 520.

The FM API support logic 540 may similarly allocate enough memory resources 528B, . . . , 528n to accommodate memory bandwidths BW2, . . . , BWn specified for logical devices LD2, . . . , LDn by the configuration logic 536 of the fabric manager 534. Thus, the various logical devices LD1, LD2, . . . , LDn may be illustrated with varying sizes and/or having various amounts of resources such as memory channels and/or memory banks 520.

In some embodiments, memory buffers 522 may be allocated separately from the memory resources 528A, . . . , 528n as shown in FIG. 5, however, in some embodiments the memory buffers may be allocated as part of the memory resources 528A, . . . , 528n.

In some embodiments, the FM API support logic 540 may be accessed through an API for the fabric manager 534 by an application 527 which may be executed, for example, partially or entirely on a host. The API may access the FM API support logic 540 through the interconnect fabric 506 or in any other manner. In some embodiments, the application 527 may perform one or more supervisory functions and/or offload one or more parallel computations to the parallel computation workload 508 at the accelerator 502. In some embodiments, the FM API support logic 540 may be implemented, for example, using one or more logical devices such as those used for logical devices 530.

The device 504 may include a DPA-to-PBA mapper 516 that may map (e.g., translate) a DPA of one or more of the logical devices 530 to one or more PBAs of one or more corresponding memory resources that have been allocated (e.g., dedicated) to the logical device 530. Thus, a DPA of each of the logical devices LD1, LD2, . . . , LDn may be mapped to one or more PBAs of memory blocks in the memory channels and/or memory banks 520 of the corresponding memory resources 528A, 528B, . . . , 528n. In some embodiments, this may essentially regroup one or more resources from a pool of resources in the device 504 into groups of resources in the memory resources 528A, 528B, . . . , 528n.

In some embodiments, the DPA-to-PBA mapper 516 may dynamically map resources to logical devices, for example, by changing the mappings when one or more logical devices are configured or reconfigured, when resources are reallocated and/or returned to a pool, and/or the like.

The parallel computation workload 508 may send one or more concurrent memory access requests 509 to the storage device 504 through the memory allocator 538. Based on the logical device configuration, resource allocation, and/or mapping described above, the concurrent memory access requests 509 may be routed to write and/or read buffers 514 at the corresponding logical devices 530. The write and/or read buffers 514 may forward the requests 509 to buffers 522 at corresponding logical devices 530 through DPA-to-PBA mapper 516. The buffers 522 may forward the requests 523 to corresponding memory resources (e.g., memory channels and/or memory banks 520 to process the concurrent memory access requests 509.

Thus, concurrent memory access requests 509 corresponding to Data Block 1, Data Block 2, . . . , Data Block n may be processed by corresponding logical devices LD1, LD2, . . . , LDn such that Data Block 1, Data Block 2, . . . , Data Block n may be written to and/or read from memory resources 528A, 528B, . . . , 528n, respectively, as shown at the bottom of FIG. 5. In some embodiments, the logical devices LD1, LD2, . . . , LDn may process the concurrent memory access requests 509 in parallel. Moreover, the data in one or more of Data Block 1, Data Block 2, . . . , Data Block n may be interleaved between the memory channels and/or memory banks 520 in the resources 528A, 528B, . . . , 528n, respectively, of the corresponding logical devices LD1, LD2, . . . , LDn. Depending on the implementation details, the amount of resources allocated to one or more logical device 530 may slightly, substantially, or closely match a bandwidth of a corresponding data block 510 such that the processing times to write and/or read multiple data blocks 510 may be slightly, substantially, or essentially equal. For example, the processing times for logical devices LD1, LD2, . . . , LDn to access Data Block 1, Data Block 2, . . . , Data Block n, respectively, may be T1, T2, . . . , Tn. Therefore, an improved or optimized processing time for multiple data blocks 510 may be determined, for example, by the longest or an average of the individual processing times T1, T2, . . . , Tn for data blocks 510. Depending on the implementation details, this may be substantially shorter than the summation of the individual processing times as described above with respect to the embodiment illustrated in FIG. 3.

In some embodiments, the memory allocator 538 may be implemented partially or entirely as part of a device driver for the device 504. The memory allocator 538 may distribute memory access requests 509 and/or allocate data to corresponding logical devices 530, for example, based on one or more tags that may accompany a request. In some embodiments, tags may be provided to, and/or associated with, requests 509, for example, by the application 527.

For purposes of illustration, the functionality described with respect to the embodiment illustrated in FIG. 5 may be shown as being located at various components such as the fabric manager 534, the FM API support logic 540, and/or the like. However, in other embodiments, any or all of this functionality may be distributed between different components, consolidated in fewer components, and/or the like. Moreover, the accelerator 502, device 504, interconnect fabric 506, and/or the like may be implemented with any types of accelerators, devices, interconnects and/or protocols, and/or the like as described above with respect to the embodiment illustrated in FIG. 4.

Figure 6:
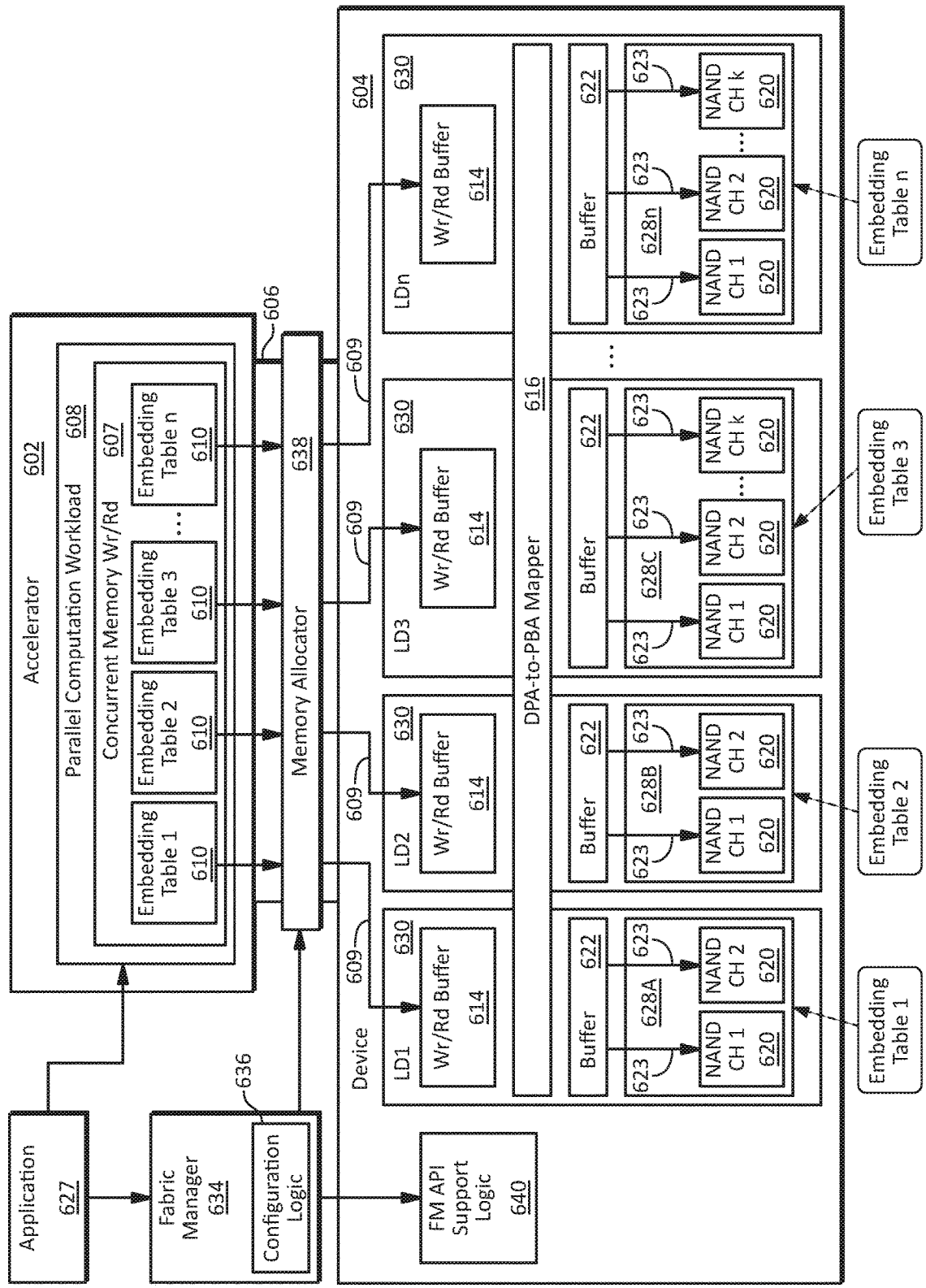
FIG. 6 illustrates another example embodiment of a system for concurrent memory access in accordance with example embodiments of the disclosure.

FIG. 6 illustrates another example embodiment of a system for concurrent memory access in accordance with example embodiments of the disclosure. The system illustrated in FIG. 6 may be similar to the embodiment illustrated in FIG. 5, however, in the system illustrated in FIG. 6, a DLRM application 627 may implement a DLRM workload 608 in which data blocks 610 may include embedding tables Emb Table 1, Emb Table 2, . . . , Emb Table n. Additionally, in the system illustrated in FIG. 6, the device 604 may be implemented as a storage device based on NAND flash memory, and therefore, some or all of the memory resources 628A, . . . , 628n may be implemented as NAND channels 620.

The DLRM application 627 may execute SLS operations that may involve concurrent accesses of the one or more embedding tables Emb Table 1, Emb Table 2, . . . , Emb Table n. The one or more embedding tables Emb Table 1, Emb Table 2, . . . , Emb Table n, and embedded vectors within the embedding tables, may have variable sizes and/or dimensions, and therefore, memory accesses of the embedding tables may have irregular access patterns.

In some embodiments, the DLRM application 627 may configure one or more logical devices 630 (e.g., LD1, LD2, . . . , LDn) with one or more bandwidth limits BW1, BW2, . . . , BWn based, for example, on a number (e.g., an average number) of lookups for a corresponding embedding table. The number of lookups may be based, for example, on a number of vectors in the embedding table. Thus, if Emb Table 3 includes 80 vectors and Emb Table 2 includes 40 vectors, the bandwidth limit BW3 for LD3 may be configured with about twice the bandwidth limit BW2 for Emb Table 2.

In some embodiments, the DLRM application 627 may configure one or more logical devices 630, for example, using configuration logic 636 in fabric manager 634 which may be accessed through an API.

In the example embodiment illustrated in FIG. 6, Emb Table 1 and Emb Table 2 may have relatively small numbers of average lookups, and therefore, the corresponding logical devices LD1 and LD2 may be configured with relatively small bandwidth limits BW1 and BW2, respectively. In contrast, Emb Table 3, . . . , Emb Table n may have relatively large numbers of average lookups, and therefore, the corresponding logical devices LD3, . . . , LDn may be configured with relatively small bandwidth limits BW3, . . . BWn, respectively.

Based on the bandwidths configured by the configuration logic 636 in fabric manager 634, the FM API support logic 640 may allocate corresponding amounts of resources to the logical devices. Thus, the FM API support logic 640 may allocate relatively small amounts of parallel resources (e.g., two NAND channels each) to logical devices LD1 and LD2. In contrast, the FM API support logic 640 may allocate relatively large amounts of parallel resources (e.g., three or more (up to "k") NAND channels each) to logical devices LD3, . . . , LDn.

The DPA-to-PBA mapper 616 may map (e.g., translate) a DPA of one or more of the logical devices 630 to one or more PBAs of one or more corresponding memory resources that have been allocated (e.g., dedicated) to the logical device 630.

Thus, the pooled NAND channels 620 of the storage device 604 may be regrouped into logical devices LD1, LD2, . . . , LDn such that the embedding tables Emb Table 1, Emb Table 2, . . . , Emb Table n (as shown at the bottom of FIG. 6) may be written to, and/or read from, corresponding groups 628A, 628B, . . . , 628n of NAND channels having memory bandwidths that may correspond, in some cases roughly, in some cases closely, to the average numbers of lookups of the corresponding embedding tables.

In some embodiments, one or more embedding vectors of an embedding table stored in a specific group (e.g., 628A, 628B, . . . , 628n) of NAND channels 620 may be interleaved across different NAND channels 620 within the group for concurrent memory access.

Therefore, when the DLRM workload 608 sends concurrent requests 609 to the storage device 604, the logical devices LD1, LD2, . . . , LDn may process the requests 609 in parallel, in some cases, using parallel groups of NAND channels 620, which may provide further parallelization of processing of concurrent write and/or read requests.

Depending on the implementation details, the arrangement illustrated in FIG. 6 may increase the speed of SLS operations for a DLRM, for example, by reducing the overall write and/or read latency to the longest or average of the individual processing times for the embedding tables Emb Table 1, Emb Table 2, . . . , Emb Table n.

Although the embodiment illustrated in FIG. 6 may be described in the context of a storage device implemented with NAND memory channels, the principles may be implemented with other types of memory including PMEM, DRAM, and/or the like, arranged in memory banks, blocks, superblocks, and/or the like. Moreover, as with the embodiment illustrated in FIG. 5, the accelerator 602, device 604, interconnect fabric 606, and/or the like illustrated in FIG. 6 may be implemented with any types of accelerators, devices, interconnects and/or protocols, and/or the like.

Figure 7:
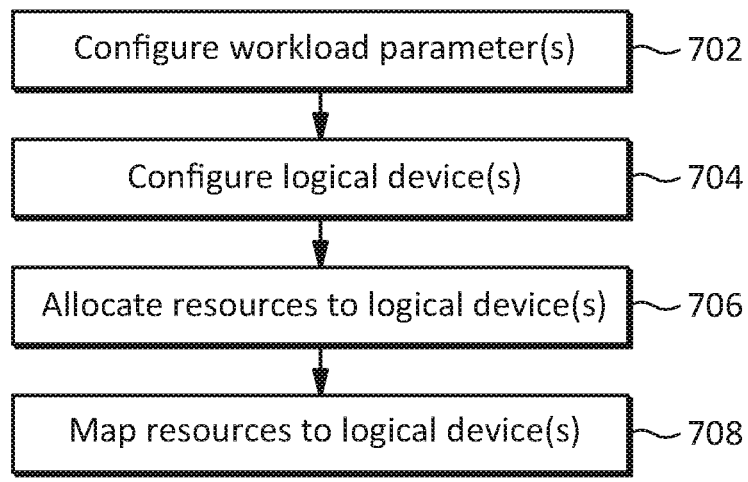
FIG. 7 illustrates an embodiment of a workflow for configuring a device in accordance with example embodiments of the disclosure.

FIG. 7 illustrates an embodiment of a workflow for configuring a device in accordance with example embodiments of the disclosure. The embodiment illustrated in FIG. 7 may be used, for example, to configure any of the embodiments illustrated in FIG. 4, FIG. 5, and/or FIG. 6.

Referring to FIG. 7, the workflow may begin at operation 702 where an application (e.g., an application that may include one or more parallel computation workloads) may configure a parallel computation workload with one or more parameters, for example, based on concurrent memory access requirements. Examples of parameters may include a bandwidth of a memory access request, a size of a data structure (e.g., a table size and/or a vector size), a number of data structures (e.g., a number of tables and/or a number of vectors), and/or the like. For example, in some embodiments, an application may configure a DLRM workload with parameters such as a size and/or number embedding tables, and a size and/or number of embedding vectors in each embedding table.

At operation 704, configuration logic (e.g., in a fabric manager) may, based on the one or more parameters configured for the parallel computation workload, configure one or more logical devices in a device. For example, the configuration logic may configure one logical device for each concurrent memory request that may be sent by the parallel computation workload configured by the application. In some embodiments, the concurrent memory requests may correspond, for example, to one or more data structures such as embedding tables that may be accessed concurrently for a parallel processing operation. The configuration logic may configure one or more logical devices by creating (e.g., enumerating, instantiating, and/or the like) a logical device, specifying one or more resources (e.g., memory resources) for a logical device, creating a binding (e.g., a binding for a memory coherent interface and/or protocol such as CXL) for a logical device, assigning a DPA to a logical device, and/or the like. In some embodiments, one or more logical devices configured by the configuration logic may be bound to one or more virtual CXL switches (VCSs), for example, by a fabric manager.

At operation 706, support logic (e.g., FM API support logic) may allocate one or more resources (e.g., memory resources) to one or more logical devices that may have been configured by the configuration logic based on configuration information provided by the configuration logic. for example, if the configuration logic has configured a first logical device with a specified amount of memory bandwidth, the support logic may allocate enough memory resources (e.g., from a pool of resources) to the logical device to accommodate the specified bandwidth. Examples of memory resources may include one or more memory channels, memory banks, memory blocks, memory superblocks, buffers, queues, cores, and/or the like to support the allocated memory channels and/or memory banks.

At operation 708, a mapper (e.g., a DPA-to-PBA mapper) may map one or more allocated resources to a corresponding logical device. For example, a mapper may map (e.g., translate) a DPA of one or more logical devices that have been configured by configuration logic to one or more PBAs of one or more corresponding memory resources that have been allocated (e.g., dedicated) to the logical device by the support logic.

The one or more logical devices may then be ready to process memory access requests (e.g., concurrent memory access requests) from the parallel computation workload.

Although the embodiment illustrated in FIG. 7 may be shown as a single pass through operations of the workflow, the workflow may branch, loop back, repeat operations, and/or the like. For example, after completing a first pass through operations 702, 704, 706, and 708, some embodiments may loop back to operations 706 and/or 708 to dynamically allocate and/or reallocate resources, dynamically map and/or remap resources, and/or the like.

Figure 8:
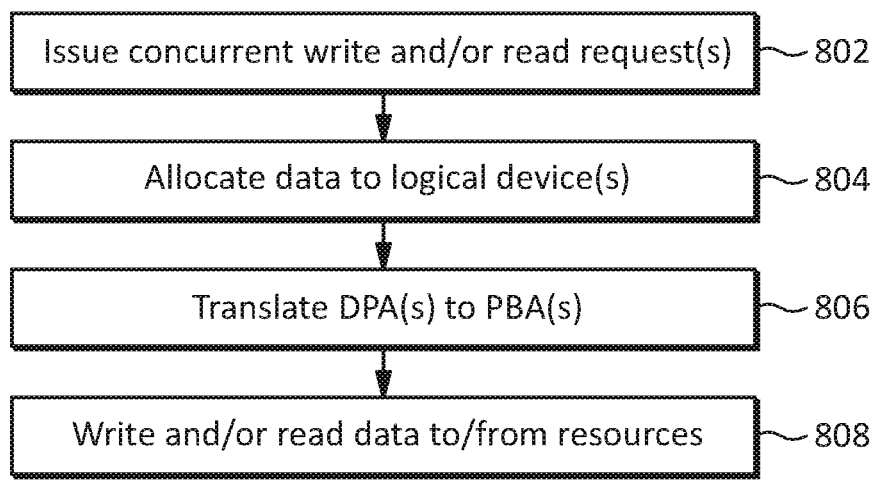
FIG. 8 illustrates an embodiment of a workflow for concurrent data write and/or read operations for a device in accordance with example embodiments of the disclosure.

FIG. 8 illustrates an embodiment of a workflow for concurrent data write and/or read operations for a device in accordance with example embodiments of the disclosure.

The embodiment illustrated in FIG. 8 may be used, for example, with any of the embodiments illustrated in FIG. 4, FIG. 5, FIG. 6, and/or FIG. 7.

Referring to FIG. 8, the workflow may begin at operation 802 where an application and/or a workload (e.g., a parallel computation workload) may issue one or more concurrent write and/or read requests to a device. For example, the one or more concurrent write and/or read requests may be to write and/or read one or more data structures to and/or from the device. In some embodiments, an application may associate one or more tags with one or more of the concurrent write and/or read requests based, for example, on a corresponding logical device.

At operation 804, a memory allocator may allocate data associated with the concurrent write and/or read requests to one or more corresponding logical devices of the device. For example, the memory allocator may direct the one or more concurrent write and/or read requests to one or more corresponding logical devices based on a tag associated with each request.

At operation 806, a mapper (e.g., a DPA-to-PBA mapper) may translate one or more DPAs of one or more logical devices to one or more PBAs of one or more corresponding memory resources that have been allocated to the corresponding logical devices to process the one or more concurrent write and/or read requests.

At operation 808, the one or more logical devices may process the one or more concurrent write and/or read requests using the corresponding allocated and mapped resources. In some embodiments, multiple logical devices may process corresponding concurrent write and/or read requests in parallel using resources that may, in turn, implement further parallelization (e.g., between allocated resources such as memory channels and/or banks) for processing the concurrent write and/or read requests.

Although the embodiment illustrated in FIG. 8 may be shown as a single pass through operations of the workflow, the workflow may branch, loop back, repeat operations, and/or the like.

Some systems and/or methods in accordance with example embodiments of the disclosure may be applied to deep learning (DL) accelerators which may involve large numbers of parallel computation units (CUs) and multiple kernels running on those CUs. In some embodiments, such accelerators may execute large parallel computational workloads that may involve concurrent data accesses that may be memory bounded. Depending on the implementation details, some systems and/or methods in accordance with example embodiments of the disclosure may improve and/or optimize such parallel computational workloads and/or concurrent data accesses.

In some embodiments, a CXL Type-3 device with storage implemented with DRAM, PMEM, low latency NAND, and/or the like in accordance with example embodiments of the disclosure may use parallel device internal resources to achieve required high bandwidth and/or memory access inputs and/or outputs (IOs). Depending on the implementation details, higher system level performance and/or service level agreement (SLA) operations may be achieved by improving or optimizing accelerator concurrent data accesses with device internal parallel resources. Some systems and/or methods in accordance with example embodiments of the disclosure may be applied, for example, to DLRM workloads which may be used in platforms for social media, ecommerce, and/or the like.

Figure 9:
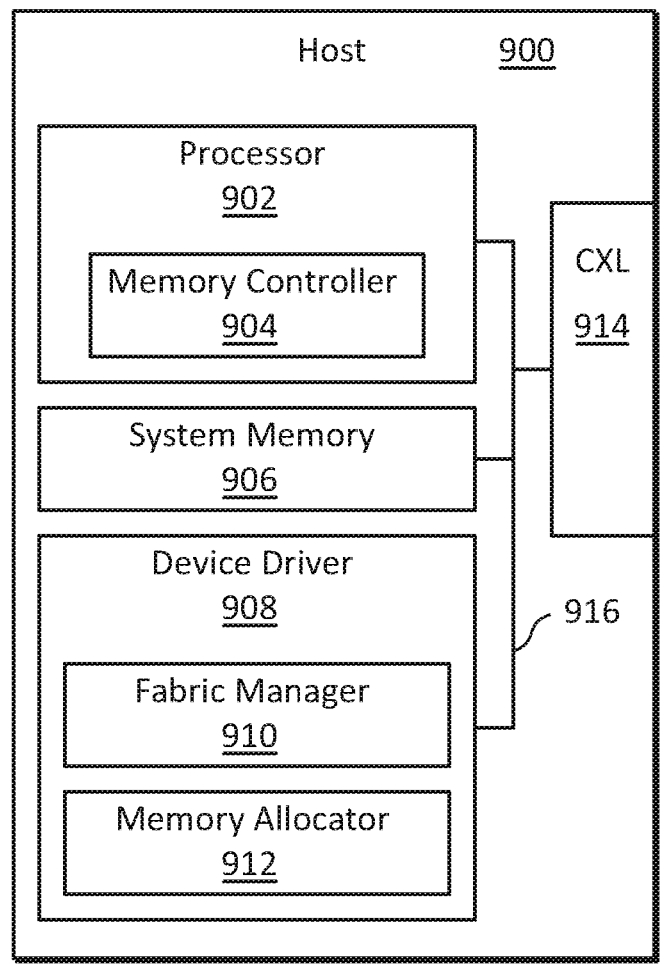
FIG. 9 illustrates an example embodiment of a host apparatus that may be used to configuring and/or use logical devices in accordance with example embodiments of the disclosure.

FIG. 9 illustrates an example embodiment of a host apparatus that may be used to configure and/or use logical devices in accordance with example embodiments of the disclosure. The host apparatus 900 illustrated in FIG. 9 may include a processor 902, which may include a memory controller 904, a system memory 906, a device driver 908, which may include fabric manager logic 910 and a memory allocator 912, and/or a interconnect interface 914, which may be implemented, for example using CXL. Any or all of the components illustrated in FIG. 9 may communicate through one or more system buses 916. In some embodiments, the host apparatus 900 illustrated in FIG. 9 may be used to implement any of the host functionality disclosed herein including any of the functionality relating to configuring and/or operating logical devices in a device. In some embodiments, one or more of the components illustrated in FIG. 9 may be implemented using other components. For example, in some embodiments, one or more of the device driver 908, fabric manager logic 910 and/or memory allocator 912 may be implemented, for example, by the processor 902 executing instructions stored in the system memory 906 or other memory.

Figure 10:
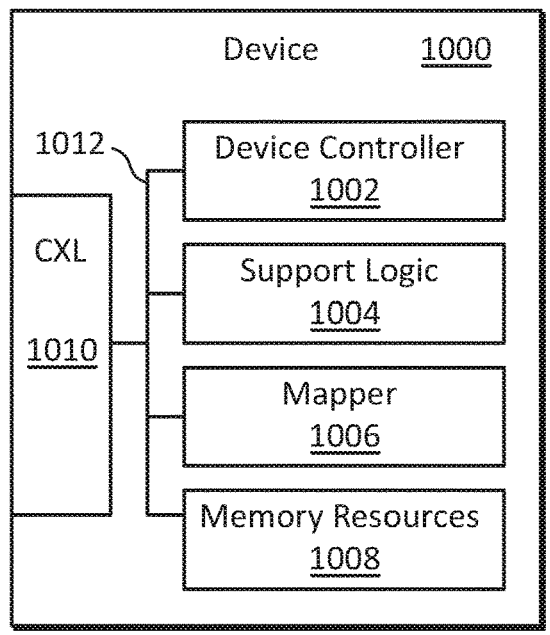
FIG. 10 illustrates an example embodiment of a device that may be used to implement one or more logical devices for processing concurrent memory access requests in accordance with example embodiments of the disclosure.

FIG. 10 illustrates an example embodiment of a device that may be used to implement one or more logical devices for processing concurrent memory access requests in accordance with example embodiments of the disclosure. The device 1000 may include a device controller 1002, support logic 1004, a mapper 1006, memory resources 1008, and an interconnect interface 1010. The components illustrated in FIG. 10 may communicate through one or more device buses 1012. In some embodiments, the device 1000 illustrated in FIG. 10 may be used to implement any of the device-side functionality relating to the use of one or more logical devices for processing concurrent memory access requests as disclosed herein.

Any of the functionality described herein, including any of the host functionality, device functionally, and/or the like described with respect to FIGS. 1-10, for example, a fabric manager, memory allocator, support logic, mapper, and/or the like, may be implemented with hardware, software, or any combination thereof including combinational logic, sequential logic, one or more timers, counters, registers, state machines, volatile memories such as DRAM and/or static random access memory (SRAM), nonvolatile memory and/or any combination thereof, complex programmable logic devices (CPLDs), field programmable gate arrays (FPGAs), application specific integrated circuits (ASICs), central processing units (CPUs) such as complex instruction set computer (CISC) processors such as x86 processors and/or reduced instruction set computer (RISC) processors such as ARM processors, graphics processing units (GPUs), neural processing units (NPUs), and/or the like, executing instructions stored in any type of memory. In some embodiments, one or more components may be implemented as a system-on-chip (SOC).

Any of the storage devices disclosed herein may be implemented in any form factor such as 3.5 inch, 2.5 inch, 1.8 inch, M.2, Enterprise and Data Center SSD Form Factor (EDSFF), NF1, and/or the like, using any connector configuration such as Serial ATA (SATA), Small Computer System Interface (SCSI), Serial Attached SCSI (SAS), U.2, and/or the like. Any of the storage devices disclosed herein may be implemented entirely or partially with, and/or used in connection with, a server chassis, server rack, dataroom, datacenter, edge datacenter, mobile edge datacenter, and/or any combinations thereof.

Figure 11:
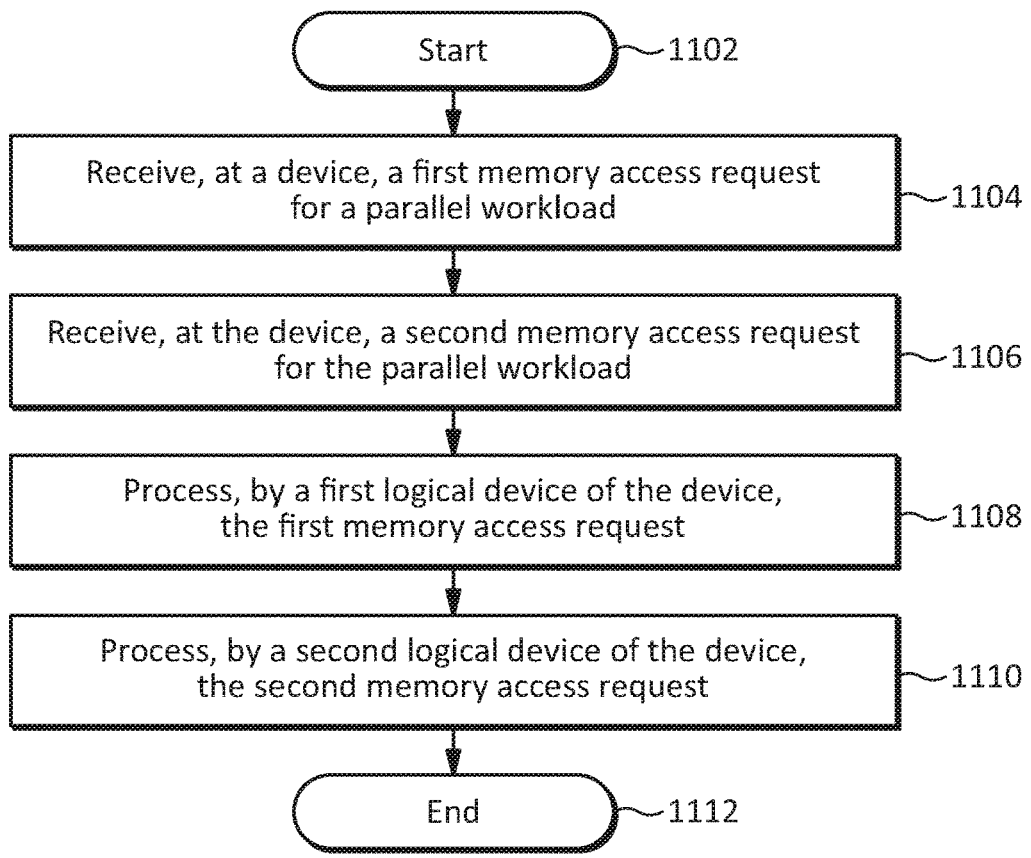
FIG. 11 illustrates an embodiment of a method for memory access in accordance with example embodiments of the disclosure.

FIG. 11 illustrates an embodiment of a method for memory access in accordance with example embodiments of the disclosure. The method may begin at operation 1102. At operation 1104, the method may receive, at a device, a first memory access request for a parallel workload. At operation 1106, the method may receive, at the device, a second memory access request for the parallel workload. In some embodiments, the first and second memory access requests may be received at the device, for example, through a memory coherent interface. At operation 1108, the method may process, by a first logical device of the device, the first memory access request. At operation 1110, the method may process, by a second logical device of the device, the second memory access request. In some embodiments, the first and second logical devices may be configured with one or more resources to process the first and second memory access requests, respectively. The one or more resources may be allocated and/or mapped to the first and second logical devices. The method may end at operation 1112.

The embodiment illustrated in FIG. 11, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. The use of terms such as "first" and "second" in this disclosure and the claims may only be for purposes of distinguishing the things they modify and may not indicate any spatial or temporal order unless apparent otherwise from context. In some embodiments, a reference to a thing may refer to at least a portion of the thing, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method for memory access, the method comprising:
receiving, at a device, a first memory access request for a parallel workload;
receiving, at the device, a second memory access request for the parallel workload;
processing, by a first logical device of the device, with a first bandwidth, the first memory access request; and
processing, by a second logical device of the device, with a second bandwidth, the second memory access request, where the first bandwidth and second bandwidth are different and are assigned based on a number of lookups of a data structure that is part of a computational model.

2. The method of claim 1, wherein processing the first memory access request and processing the second memory access request comprises parallel processing the first memory access request and the second memory access request.

3. The method of claim 1, wherein the first logical device comprises one or more first resources.

4. The method of claim 3, wherein the second logical device comprises one or more second resources.

5. The method of claim 3, wherein:
the first logical device has a device physical address (DPA); and
the DPA is mapped to a physical block address (PBA) of the one or more first resources.

6. The method of claim 1, wherein the first memory access request comprises a tag corresponding to the first logical device.

7. The method of claim 1, further comprising configuring the first logical device based on one or more first parameters of the parallel workload.

8. The method of claim 7, wherein configuring the first logical device is performed by a fabric manager.

9. The method of claim 7, further comprising allocating one or more first resources to the first logical device based on at least one of the one or more first parameters of the parallel workload.

10. The method of claim 9, further comprising mapping the one or more first resources to the first logical device.

11. The method of claim 7, further comprising configuring the second logical device based on one or more second parameters of the parallel workload.

12. A device comprising:
a communication interface;
a first logical device having a first bandwidth, configured to:
    receive, through the communication interface, a first memory access request; and
    process, using one or more first resources, the first memory access request; and
a second logical device having a second bandwidth, configured to:
    receive, through the communication interface, a second memory access request; and
    process, using one or more second resources, the second memory access request, where the first bandwidth and second bandwidth are different and are assigned based on a number of lookups of a data structure that is part of a computational model.

13. The device of claim 12, wherein the first logical device and the second logical device are configured to parallel process the first memory access request and the second memory access request.

14. The device of claim 12, further comprising:
support logic configured to allocate the one or more first resources to a first logical device based on first configuration information received through the communication interface;
and mapping logic configured to map the one or more first resources to the first logical device.

15. The device of claim 14, wherein:
the support logic is configured to allocate the one or more second resources to a second logical device based on second configuration information received through the communication interface; and
the mapping logic is configured to map the one or more second resources to the second logical device.

16. The device of claim 14, wherein the support logic is configured to receive the first configuration information by an application programming interface.

17. The device of claim 12, wherein the communication interface comprises a memory coherent interface.

18. A device comprising:
a communication interface;
one or more first memory resources;
one or more second memory resources;
support logic configured to allocate the one or more first memory resources to a first logical device based on first configuration information received through the communication interface, where the first logical device has a first bandwidth;
the support logic is configured to allocate the one or more second memory resources to a second logical device, where the second logical device has a second bandwidth and the first bandwidth and second bandwidth are different and the first and second bandwidth are assigned based on a number of lookups of a data structure that is part of a computational model; and
mapping logic configured to map the one or more first memory resources to the first logical device.

19. The device of claim 18, wherein:
the support logic is configured to allocate the one or more second memory resources to the second logical device based on second configuration information received through the communication interface; and
the mapping logic is configured to map the one or more second memory resources to the second logical device.

20. The device of claim 18, wherein the support logic is configured to receive the first configuration information by an application programming interface.

* * * * *